United States Patent [19]
Choi

[11] Patent Number: 5,565,673
[45] Date of Patent: Oct. 15, 1996

[54] OPTICAL RECEPTION DEVICE OF REMOTE CONTROLLER HAVING IMPROVED OPTICAL EFFICIENCY

[75] Inventor: Soon-cheol Choi, Suwon, Rep. of Korea

[73] Assignee: Samsung Electronics Co., Ltd., Kyungki-Do, Rep. of Korea

[21] Appl. No.: 396,434

[22] Filed: Feb. 28, 1995

[30] Foreign Application Priority Data

Feb. 28, 1994 [KR] Rep. of Korea ............... 94-3904

[51] Int. Cl.⁶ .................................................. H01J 5/16
[52] U.S. Cl. ........................... 250/227.11; 250/227.18; 385/124
[58] Field of Search ............... 250/227.11, 227.18, 250/227.13; 385/12, 124, 132, 133, 142, 141, 32; 356/438; 340/577, 578; 359/179, 188, 195

[56] References Cited

U.S. PATENT DOCUMENTS

| | | | |
|---|---|---|---|
| 3,823,997 | 7/1974 | Gloge et al. | 385/124 |
| 3,923,486 | 12/1975 | Kitano et al. | 385/124 |
| 4,856,859 | 8/1989 | Imoto | 385/124 |
| 5,018,811 | 5/1991 | Haavisto et al. | 385/124 |

*Primary Examiner*—Que T. Le
*Attorney, Agent, or Firm*—Sughrue, Mion, Zinn, Macpeak & Seas

[57] ABSTRACT

An optical reception device of a remote controller includes an optical transfer guide and an optical sensor. A refractive index of the optical transfer guide is varied along a predetermined direction so that an optical signal incident to the optical transfer guide vertically reaches the optical sensor while being refracted along the longitudinal axis of the optical transfer guide. The optical reception device improves the optical reception efficiency of the optical sensor, and can be used in a remote controller for various electronic products.

6 Claims, 1 Drawing Sheet

OPTICAL RECEPTION DEVICE OF REMOTE CONTROLLER HAVING IMPROVED OPTICAL EFFICIENCY

BACKGROUND OF THE INVENTION

1. Field of the Invention

The present invention relates to an optical reception device of a remote controller, and more particularly, to an optical reception device of a remote controller, where the optical signal reception efficiency is improved by adopting a refractive index distribution lens.

2. Description of the Related Art

Generally, remote control systems for remotely controlling televisions, videocassette recorders, compact disc players and other household electronic products are composed of a transmission device in the remote controller itself, for emitting an optical signal (mainly, an infrared signal) and a reception device in the apparatus to be controlled, for receiving the optical signal transmitted across a space from the transmission device.

FIG. 1 is a schematic cross-sectional view of a conventional remote controller reception device. The remote controller reception device comprises an optical reception window 101 to which the optical signal is incident, an optical transfer guide 102 having a cylindrical shape for transferring the optical signal passed through optical reception window 101 and an optical sensor 103 for sensing an optical signal transferred via optical transfer guide 102. The optical signal incident via optical reception window 101 travels along the longitudinal axis of optical transfer guide 102 while being reflected on the inner wall of optical transfer guide 102 to reach an optical sensor 103. An incident angle is defined when an optical signal is incident to optical reception window 101.

In the conventional remote controller reception device shown in FIG. 1, there is no problem when the incident angle is small. However, when the incident angle is large, i.e., the remote controller transmission device and the optical reception window of the remote controller reception device are grossly unparallel, multiple reflections occur on the inner wall of optical transfer guide 102, so that the signal is weakened and the reception efficiency of the optical sensor is reduced. Also, when the optical signal is incident on the optical sensor at a large incident angle, the sensitivity of the optical sensor is reduced so that the remote control function cannot be performed reliably.

FIG. 2 shows an improved optical reception device for overcoming the above-describe problems, where the optical reception window of the remote controller reception device shown in FIG. 1 has a convex lens 201 so that the optical signal can be more exactly focused on the center of optical sensor 203. As a characteristic of convex lens, the optical signal is refracted to reach a position comparatively far from the convex lens, of the inner walls of optical transfer guide 202, even when the incident angle of optical signal is large. As a result, the occurrence of multiple reflections on the inner walls of optical transfer guide 202 is slightly restricted, so that the reception efficiency of the optical signal is increased compared with the remote controller reception device shown in FIG. 1.

However, in the case of the remote controller reception devices shown in FIGS. 1 and 2, since the occurrence of multiple reflections in the inner wall of optical transfer guide cannot be overcome, the transfer efficiency of the optical signal is inherently reduced.

SUMMARY OF THE INVENTION

To solve the above problems, it is an object of the present invention to provide a remote controller reception device which can be operated reliably, even when the optical signal is incident at a comparatively large angle, by restricting the multiple reflections of the optical signal, in the inner wall of the optical transfer guide. This is accomplished by adopting an optical transmission medium having a different refractive index at each portion of the interior as the optical transfer guide.

To achieve the above object, there is provided an optical reception device of a remote controller comprising an optical transfer guide and an optical sensor for sensing an incident optical signal via an optical transfer guide. A refractive index of the optical transfer guide is varied along a predetermined direction, whereby the optical signal incident to the optical transfer guide vertically reaches to the optical sensor while being refracted in parallel with the longitudinal axis of the optical transfer guide.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE PREFERRED EMBODIMENTS

First, a refractive index distribution lens used as the optical transfer guide of the preferred embodiment of the present invention will be described. A typical optical lens has a constant refractive index. However, a lens in which the refractive index of each portion of the interior is varied according to a specific distribution profile is called as a gradient lens or refractive index distribution lens.

Optical fiber is an example of the refractive index distribution lens. Generally, the optical fiber for transmitting a very high frequency signal such as laser beam has a center portion (core) of a higher refractive index and a peripheral portion (cladding) of a lower refractive index. When light is incident on such an optical fiber, the light is transmitted to a point far from the incident position without energy loss while being reflected and refracted like waves.

According to the present invention, the optical signal which is incident at a large incident angle is transmitted nearly vertically to the optical sensor without the multiple reflection phenomenon, by adopting s structure similar to an optical fiber structure used for the optical communication technology to the remote controller reception device.

The methods for varying the refractive index of the optical transmission medium such as an optical fiber are different according to the material of the optical transmission medium, such as quartz glass, multi-component glass and plastics. However, the desired refractive index can be obtained by changing the concentration of dopant included in the material, using a chemical vapor deposition or vapor phase axial deposition.

Figure 1:
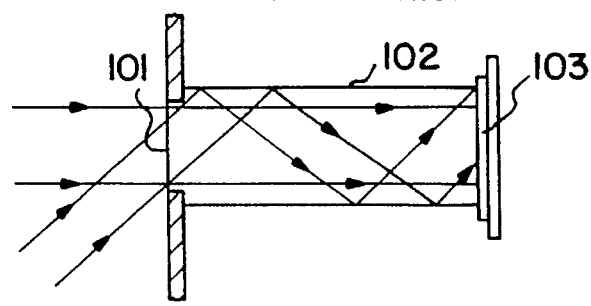
FIG. 1 is a schematic cross-sectional view of a known improved optical reception device of the conventional remote controller.
Figure 2:
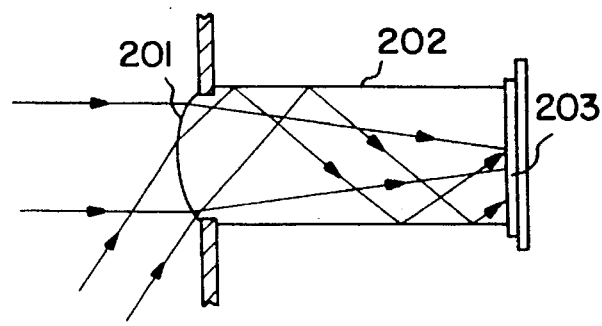
FIG. 2 is a schematic cross-sectional view of a known improved optical reception device.
Figure 3:
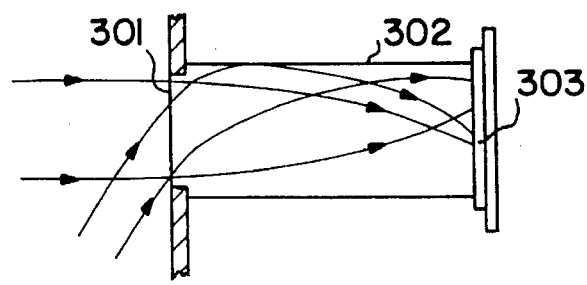
FIG. 3 is a schematic cross-sectional view of an optical reception device of remote controller according to a first preferred embodiment of the present invention.

FIG. 3 is a schematic cross-sectional view of a remote controller reception device according to a preferred embodiment of the present invention. Here, the above-described refractive index distribution lens is used as optical transfer guide 302.

In a preferred embodiment according to the present invention, refractive index n(R) of the refractive index-distribution lens in the interior of optical transfer guide is defined by the following formula, where n(R) represents the refractive index at a position removed from the center of the optical transfer guide interior by a distance R, no represents the basic refractive index, R represents the linear distance from the center (0,0) of a refractive index distribution lens in an x-y coordinate system, and $\sqrt{A}$ represents a known adjustment coefficient which can be obtained through routine experimentation and which is generally disclosed by the manufacturer of a lens.

$$n(R) = n_0 - \frac{(\sqrt{A} \times R)^2}{2} \quad (1)$$

$$R^2 = x^2 + y^2$$

The refractive index of the optical transmission medium satisfying the above formula is the greatest at the center of cross-section (parallel with the optical incident surface) and is decreased toward the peripheral portion.

When the incident angle is 0°, light is vertically incident to optical reception window 301 and is focused on optical sensor 303, without reflection from the inner wall of optical transfer guide 302. Also, light which is incident at a large incident angle (that is, in the case where the light is obliquely incident) is gently reflected from the inner wall of optical transfer guide 302 and the path thereof is turned toward the central axis, so that the light is converged on the center of optical sensor 303. Thus, even when the light is incident at a large incident angle, the light is exactly focused on the center of optical sensor without the multiple reflections so that the sensitivity of the remote controller reception device is improved.

Figure 4:
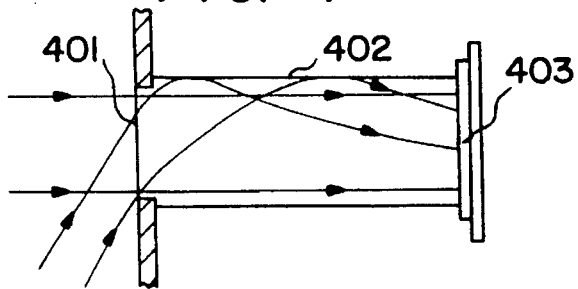
FIG. 4 is a schematic cross-sectional view of an optical reception device of remote controller according to a second preferred embodiment of the present invention.

FIG. 4 shows a remote controller reception device according to another preferred embodiment of the present invention. Refractive index n(Z) of refractive index distribution lens used as the optical transfer guide satisfies the following formula, where Z represents the distance from the optical incident surface to the optical transfer guide in the longitudinal direction, $n_0$ represents the basic refractive index and $\alpha$ represents a known adjustment coefficient which can be obtained through routine experimentation or from the lens manufacturer.

$$n(Z) = n_0 - \alpha Z \quad (2)$$

According to the refractive index distribution satisfying the above formula, the refractive index is gradually reduced toward the optical sensor of the remote controller reception device. Parallel light which is incident at a incident angle of 0° reaches optical sensor 403 without any change. Also, light which is incident at a large incident angle is gently reflected from the inner wall of optical transfer guide 402. Thereafter, the path of the light is turned toward the longitudinal direction of optical transfer guide so that the light reaches optical sensor 403 nearly vertically.

As described above, an optical signal can be detected by the optical sensor without loss of the signal even when the optical signal is obliquely incident, by using the optical transmission medium having variable refractive index, that is, refractive index distribution lens, as the optical transfer guide of the optical reception device. Accordingly, the signal reception efficiency of the remote controller can be improved.

The present invention can be applied to the remote controller of any apparatus. Specifically, while the invention has been described through preferred embodiments, various modifications can be made without departing from the scope of the invention as defined by the appended claims.

What is claimed is:

1. An optical reception device of a remote controller, said optical reception device comprising:

an optical transfer guide; and an optical sensor coupled to said optical transfer guide for sensing an incident optical signal via said optical transfer guide, a refractive index of said optical transfer guide being varied along a predetermined direction, whereby the optical signal incident upon said optical transfer guide travels to said optical sensor while being refracted along the longitudinal axis of said optical transfer guide wherein the refractive index of said optical transfer guide is defined by the following formula:

$$n(R) = n_0 - \frac{(\sqrt{A} \, xR)^2}{2}$$

$$R^2 = x^2 + y^2$$

wherein n(R) represents the refractive index at a position removed from the center of the optical transfer guide interior by a distance R, $n_0$ represents the basic refractive index at the center of the optical transfer guide, R represents the linear distance from said center (0,0) of said optical transfer guide in an x-y coordinate system, and $\sqrt{A}$ represents an adjustment coefficient.

2. An optical reception device of a remote controller as claimed in claim 1, wherein the refractive index of said optical transfer guide is continuously varied along the predetermined direction.

3. An optical reception device of a remote controller as claimed in claim 2, wherein the refractive index of said optical transfer guide is gradually reduced as a point of refraction becomes radially more distant from a central axis of said optical transmission guide.

4. An optical reception device of a remote controller as claimed in claim 2, where the refractive index of said optical transfer guide is reduced as a point of refraction becomes longitudinally more distant from an incident surface of said optical transmission guide.

5. An optical reception device of a remote controller as claimed in claim 4, wherein the refractive index of said optical transfer guide is defined by the following formula $$n(Z) = n_0 - \alpha Z$$

wherein Z represents the distance from the optical incident surface of the optical transfer guide in the longitudinal direction, $n_0$ represents the basic refractive index at the optical incident surface of the optical transfer guide and $\alpha$ represents an adjustment coefficient.

6. An optical reception device of a remote controller, said optical reception device comprising:

an optical transfer guide; and an optical sensor coupled to said optical transfer guide for sensing an incident optical signal via said optical transfer guide, a refractive index of said optical transfer guide being varied along a predetermined direction, whereby the optical signal incident upon said optical transfer guide travels to said optical sensor while being refracted along the longitudinal axis of said optical transfer guide, the refractive index of said optical transfer guide being continuously varied along the predetermined direction, being reduced as a point of refraction becomes longitudinally more distant from an incident surface of said optical transmission guide and wherein the refractive index of said optical transfer guide is defined by the following formula $$n(Z)=n_0-\alpha Z$$

wherein Z represents the distance from the optical incident surface of the optical transfer guide in the longitudinal direction, $n_0$ represents the basic refractive index at the optical incident surface of the optical transfer guide and $\alpha$ represents an adjustment coefficient.

* * * * *